Sept. 15, 1925.  
E. H. REMDE  
MOTOR VEHICLE FRAME  
Filed Nov. 20, 1920
1,554,167
3 Sheets-Sheet 1
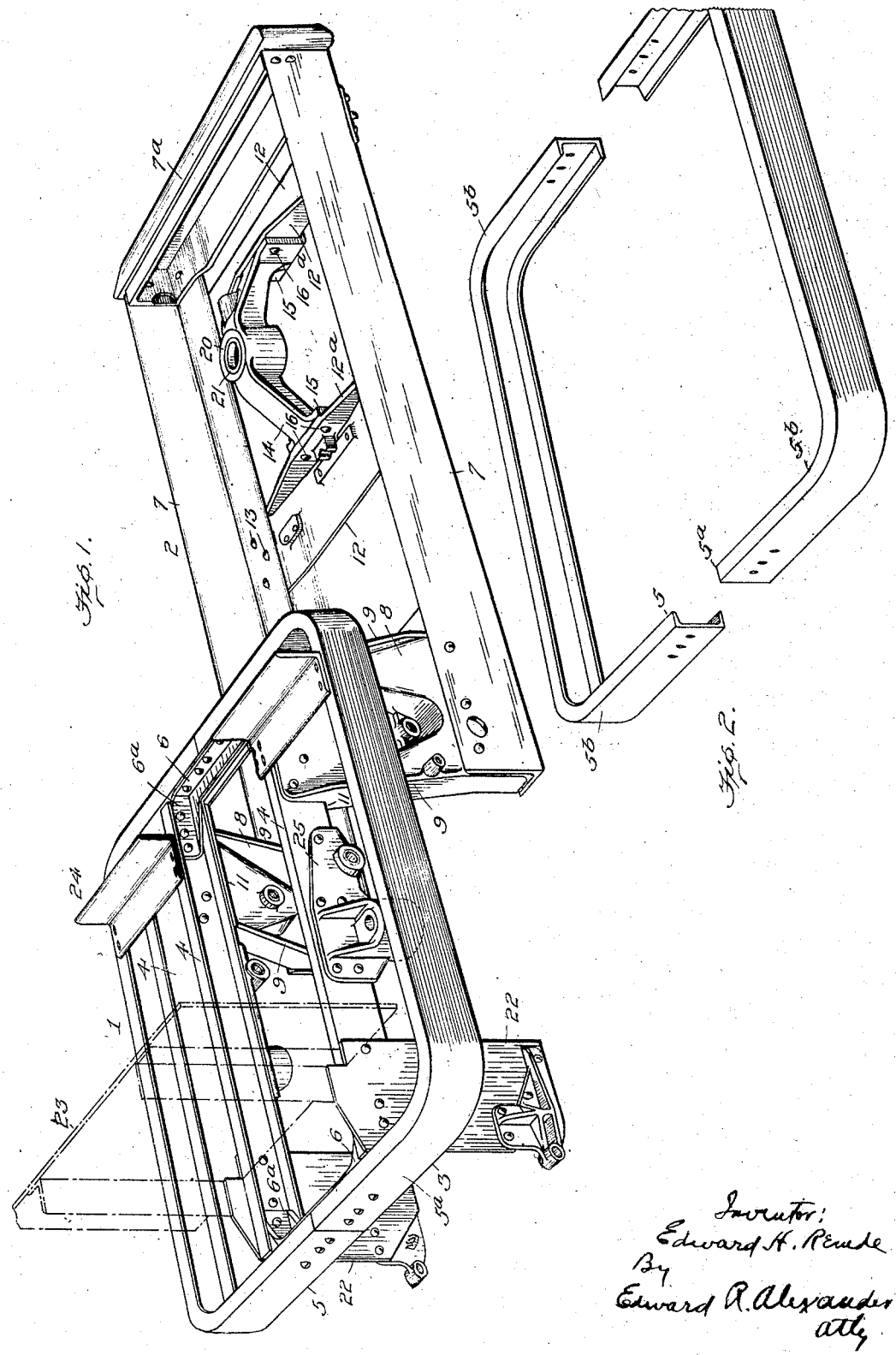

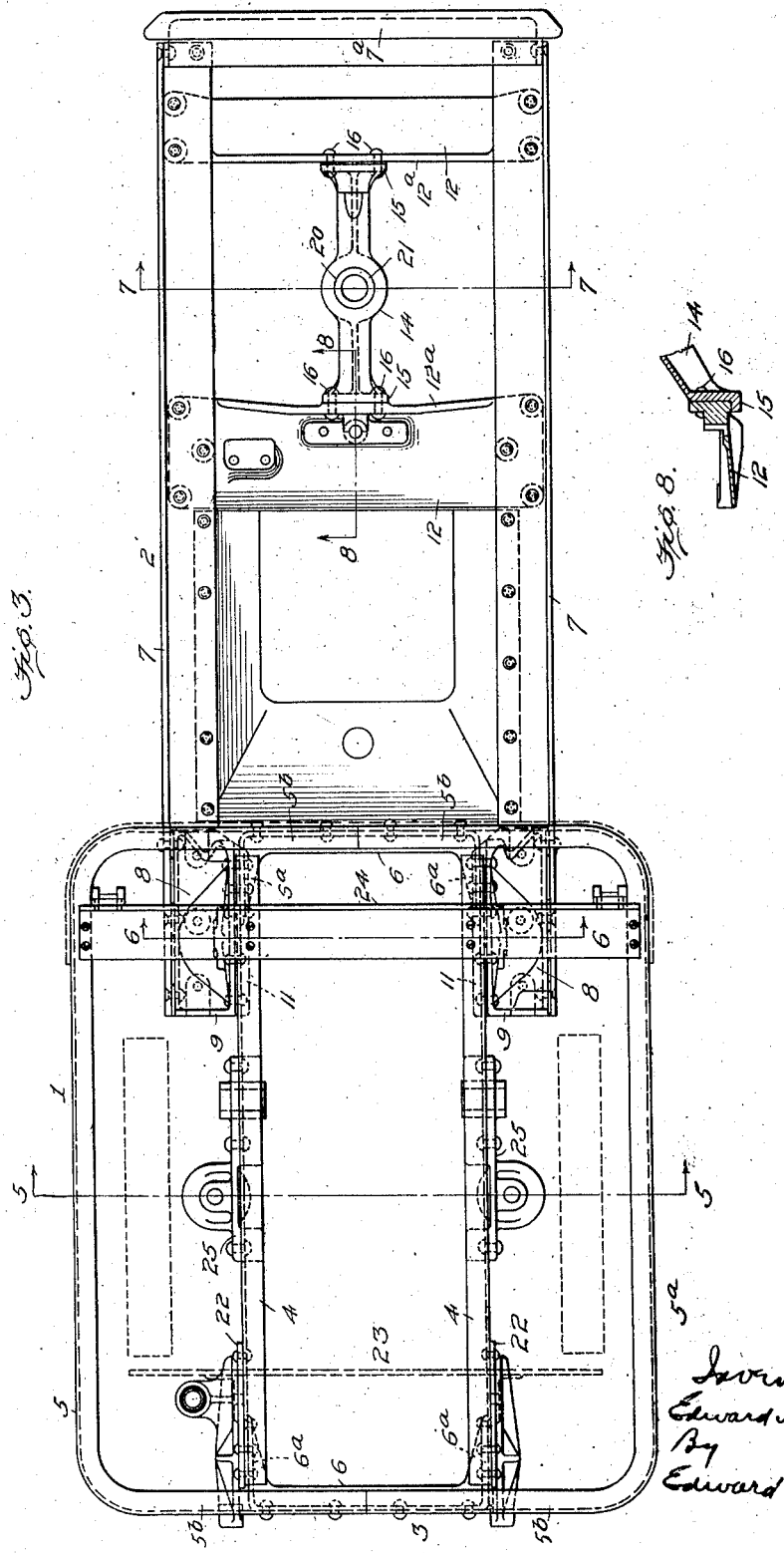

Sept. 15, 1925.  1,554,167
E. H. REMDE
MOTOR VEHICLE FRAME
Filed Nov. 20, 1920  3 Sheets-Sheet 3
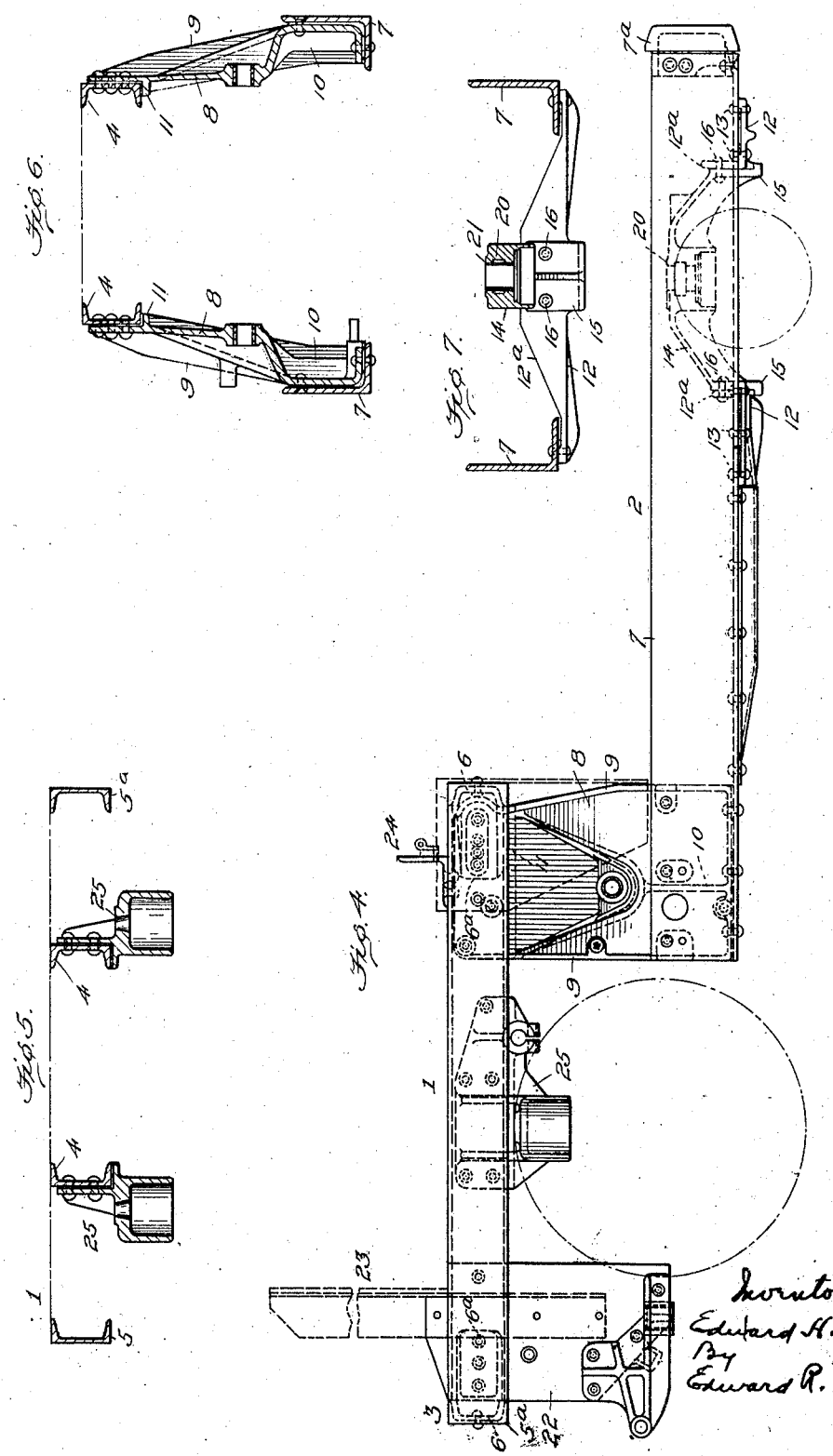

Patented Sept. 15, 1925.

1,554,167

UNITED STATES PATENT OFFICE.

EDWARD H. REMDE, OF CLEVELAND, OHIO, ASSIGNOR TO THE BAKER R & L COMPANY, OF CLEVELAND, OHIO, A CORPORATION OF OHIO.

MOTOR-VEHICLE FRAME.

Application filed November 20, 1920. Serial No. 425,555.

*To all whom it may concern:*

Be it known that I, EDWARD H. REMDE, citizen of the United States, residing at Cleveland, in the county of Cuyahoga and State of Ohio, have invented certain new and useful Improvements in and Relating to Motor-Vehicle Frames, of which the following is a specification.

This invention relates to a motor vehicle, more particularly to the frame thereof.

One object of the invention is to provide a vehicle frame that is relatively strong and rigid and capable of supporting a load and withstanding the strains incident to operation of the vehicle, including those due to quick stopping and starting.

Another object of the invention is to provide an improved vehicle frame formed of relatively few parts to insure lightness and cheapness in construction.

Another object of the invention is to provide an improved vehicle frame formed from a pair of channel bars which are correlated and shaped to utilize their maximum strength and to form flat outer side buffing surfaces for the vehicle.

Other objects of the invention will be apparent to those skilled in the art to which my invention relates from the following description taken in connection with the accompanying drawings.

For the purpose of illustration, I have, in the accompanying drawings shown and herein described one form of apparatus embodying my invention.

Figure 1 is a perspective view of a vehicle frame embodying my invention and particularly adapted for an elevating platform type of truck.

Fig. 2 is a perspective view of the main frame, the members thereof being slightly separated.

Fig. 3 is a top plan view of the frame shown in Fig. 1.

Fig. 4 is a side elevation of the frame shown in Fig. 1.

Figs. 5, 6 and 7 are sectional views on the lines 5—5, 6—6 and 7—7, respectively, of Fig. 3.

Fig. 8 is a section on the line 8—8 of Fig. 3.

In the drawings 1 indicates as an entirety a main frame. 2 indicates as an entirety a sub-frame, which, in the disclosure herein, is correlated with the main frame 1 to illustrate how it may be adapted for use in an elevating platform type of truck, such as shown in the co-pending application of John H. Hertner, Serial No. 322,835, filed September 10, 1919.

The main frame 1 comprises a member 3 preferably of substantially rectangular shape and a plurality of spaced connecting bars 4 (preferably extending longitudinally) secured at their opposite ends to the front and rear sections of the rectangular frame 3 in any well-known way, but preferably in the manner to be later set forth.

The frame member 3 comprises a pair of rolled channel bars 5, 5$^a$, which are bent into substantially U-shape and correlated with their free ends arranged end to end, as shown in Figs. 1, 2 and 3, thus forming an open rectangular frame. As shown, the opposite ends of each of the channel bars 5, 5$^a$, are bent inwardly at right angles on transverse lines, preferably about a relatively short arc, as shown at 5$^b$, to form the front and rear sections of the rectangular member 3, each inturned leg 5$^b$ being preferably one-half the length of the front or rear section, and each connecting bar 4, which may be a rolled channel bar, extends from one leg 5$^b$ of a U-bar to the other leg 5$^b$ thereof. As shown, each channel bar 5, 5$^a$, is bent on transverse lines laterally relative to that side from which the flanges of the bar project. This arrangement prevents distortion of the flanges or tearing or breaking thereof at the bend due to stretching, which would evidently result if the bars were bent in the opposite direction, or with their flanges on the outside of the bend. This arrangement also provides frame side sections having relatively broad smooth outer side surfaces, which may serve as buffing surfaces for the vehicle, thus enabling it to be actuated in narrow spaces and circuitous passages without injury to adjacent walls or objects.

6 indicates as an entirety the means for connecting the longitudinal connecting bars 4 to the front and rear sections of the frame member 3. The connecting means 6 are preferably utilized to connect together end to end the adjacent inturned legs 5$^b$. These connecting means 6 comprise a pair of channel shaped plates having their free ends 6$^a$ bent at right angles to form U-shaped elements, which fit within the channels of the legs 5ᵇ and channels of the connecting bars 4, the latter being arranged so that their channels are toward each other. The connecting plates 6 and legs 6ᵃ are rigidly connected to the walls of the legs 5ᵇ and bars 4 by rivets in a well-known manner.

The sub-frame 2 preferably comprises a pair of side members 7 connected at their rear ends by a tail piece 7ᵃ preferably cast from iron or steel and capable of withstanding heavy blows should the truck or vehicle be driven against a wall or other obstruction. The side members may each consist of an angle bar preferably arranged to have one side wall of the bar extend inwardly so that its other wall may present a flat outer side surface.

8, 8, indicate a pair of standards for connecting the main frame 1 and sub-frame 2 rigidly together. As shown in Fig. 3, the main frame 1 is wider than the sub-frame 2. This construction permits the traction and steering wheels (indicated in dotted lines in Figs. 3 and 4) for the vehicle to be arranged within or between the side sections of the frame 3. Accordingly, it will be seen that the wheels will not project beyond the sides of the vehicle and cause trouble in operating it by contact with walls and surrounding objects. This construction also permits the standards 8 to be rigidly secured to the outer sides of the bars 4 and the inner sides of the angle bars 7, whereby the inturned walls or flanges on the latter may be advantageously utilized as seats for the standards (see Fig. 6). The standards 8 are preferably arranged at the rear end of the frame 1.

Each standard 8 comprises a casting having flanges 9 and strengthening ribs 10, and near its upper end it may be provided with a projecting wall 11 to form a seat for the adjacent bar 4 (see Fig. 6).

12 indicates a pair of cross plates rigidly secured at their opposite ends to the inturned walls of the angle bars 7 in any desired manner, but preferably by rivets 13. The cross plates are preferably of the angle type, their up-standing walls 12ᵃ being arranged to oppose each other.

14 indicates a strut member extending longitudinally of the frame 2, arranged midway between the angle bars 7 and supported at its opposite ends on the cross bars 12. The strut member 14 is preferably provided at each end with a foot member 15 adapted to fit against and be secured to the outer faces of the adjacent angle plate by rivets 16 or other suitable means.

The center portion of the strut member 14 is formed with an opening 20 to receive a bushing 21, which forms a bearing for a stud shaft or pin (not shown) for the axle of a pair of supporting wheels at the adjacent end of the vehicle.

22 indicates a pair of depending brackets for supporting the step (not shown) of the vehicle. 23, 24, indicate walls to which certain elements of the vehicle body are secured.

25 indicates castings which are secured to the bars 4. Each casting is formed with an inverted cup member to receive one end of one of the vehicle springs. When the frame 1 is connected and correlated with a sub-frame 2 for an elevating platform type of truck, one of the castings 25 is provided on each bar 4 at a point substantially midway between the front and rear sections of the frame member 3.

By my invention I have sought to provide a rigid frame which is relatively light and economical to manufacture. In forming the frame from channel bars and bending them toward that side on which the flanges or sides of the channel are disposed, I utilize the maximum strength of the bars without distorting or weakening the flanges or sides of the channels; and at the same time I provide relatively wide smooth outer surfaces for buffing walls, without any additional equipment or expense. This form of construction is also advantageous in a vehicle frame where the structural parts thereof are offset or arranged in different planes, such as in an elevating platform type of truck.

From the foregoing description it will be seen that I have provided a vehicle frame for an industrial type of truck the elements of which are shaped and connected to form a rigid and relatively simple construction, and one that is economical and easy to manufacture.

To those skilled in the art of making mechanism of the class described, many alterations in construction and widely differing embodiments and applications of my invention will suggest themselves, without departing from the spirit and scope thereof. My disclosures and the description herein are purely illustrative and are not intended to be in any sense limiting.

What I claim is:

1. A vehicle frame comprising a pair of channel bars each of U-shape and disposed with their flanges extending inwardly and their free ends in end to end engagement to form a frame having front, rear and side sections, an intermediate bar extending between the legs of each U-shaped channel bar, and means engaging said intermediate bars and channel bars and seated in the channels of the latter bars for securing said bars together.

2. A vehicle frame comprising a pair of channel bars each of U-shape and arranged with the free ends of their legs in end to end relation to form a frame member having front, rear and side sections, a plurality of bars secured at their opposite ends to the legs of said channel bars to connect together the sections of said frame formed by the legs, and means carried by said connecting bars arranged to engage the springs for the vehicle.

3. A vehicle frame comprising a pair of channel bars each of U-shape and arranged with their free ends end to end to form a frame member having front, rear and side sections, an intermediate channel bar extending between the legs of each U-shaped channel bar and arranged so that its channel faces the channel of the other intermediate bar, and means seated in the channels of said U-shaped bars and intermediate bars for connecting them together.

4. A vehicle frame comprising a pair of channel bars each of U-shape and arranged with their free ends end to end to form a frame member having front, rear and side sections, a plurality of intermediate channel bars extending between opposing sections of said frame member, U-shaped members fitting the channels of said U-shaped bars and the channels at the adjacent ends of the intermediate bars, and means for securing said U-shaped members, U-shaped channel bars and intermediate bars together.

5. A vehicle frame comprising a pair of U-shaped channel elements the corresponding legs of which are connected end to end to form a main frame having front and rear and parallel side sections, a sub-frame arranged in a plane below but parallel to the plane of said main frame, said sub-frame comprising a pair of angle members one wall of each of which extends inwardly, and standards seated on the inwardly extending walls of said angle members and secured thereto and to said main frame for rigidly connecting said frames together.

6. A vehicle frame comprising a pair of U-shaped channel members, the legs of which are connected end to end to form the front and rear sections of the frame parallel to each other, channel bars extending longitudinally of the frame between corresponding legs of said U-shaped members, U-shaped plates fitting within the channels of the last mentioned channel bars and the channels of said U-shaped members at corresponding ends thereof respectively and over-lapping the joint between said U-shaped members, and means for securing each U-shaped plate to the adjacent end of each channel bar.

7. A vehicle frame comprising a pair of U-shaped channel members, the corresponding legs of which are connected end to end to form a main frame having front, rear and parallel side sections, a pair of channel bars extending between the front and rear sections of said main frame in parallel relationship, a sub-frame arranged in a plane below but parallel to the plane of said main frame, said sub-frame comprising a pair of angle members, and standards seated on the walls of said angle members and secured thereto and to the last mentioned channel bars for rigidly connecting said frames together.

8. A vehicle frame comprising a main frame and a sub-frame arranged in a plane below but parallel to the plane of said main frame, said sub-frame comprising a pair of parallel angle members, angled cross members supported by said angle members, and an axle supporting member having feet engaging and secured to said cross members, said axle supporting member being arranged between said angle members.

In testimony whereof I affix my signature.

EDWARD H. REMDE.